United States Patent [19]

Change et al.

[11] 3,960,018

[45] June 1, 1976

[54] CONFORMAL PRESSURE TRANSDUCER

[75] Inventors: Nicholas D. Change, West Seneca; Michael T. Riggs, Batavia, both of N.Y.

[73] Assignee: PCB Piezotronics, Inc., Depew, N.Y.

[22] Filed: Nov. 7, 1974

[21] Appl. No.: 521,687

Related U.S. Application Data

[60] Division of Ser. No. 381,700, July 23, 1973, Pat. No. 3,886,792, which is a continuation-in-part of Ser. No. 234,017, March 13, 1972, abandoned.

[52] U.S. Cl. ............................... 73/398 R; 73/167
[51] Int. Cl.² ............................................. G01L 9/08
[58] Field of Search ........... 73/167, 398 R, 398 AR, 73/35, 88.5 SD, 419; 310/8.3, 8.7, 8.9, 9.1, 9.4

[56] References Cited
UNITED STATES PATENTS

| | | | |
|---|---|---|---|
| 3,240,207 | 3/1966 | Barker et al. | 73/88.5 SD |
| 3,337,844 | 8/1967 | Baltakis | 73/398 R |
| 3,511,088 | 5/1970 | Weaver | 73/398 R |
| 3,603,152 | 9/1971 | Alibert | 73/398 R |
| 3,698,249 | 10/1972 | Weaver | 73/398 R |

Primary Examiner—Donald O. Woodiel
Attorney, Agent, or Firm—Christel & Bean

[57] ABSTRACT

A transducer for converting pressure changes into electrical signals wherein the pressure changes act on one surface of a relatively thin wall, such as pressure changes within a tube. A piston means on one end of a transducer housing and integral therewith has a contoured end surface conforming to the other surface of the wall opposite the surface on which pressure changes act. When the pressure changes are within a tube, for example within a cartridge casing in ammunition testing, the contoured end surface is concave. Piezoelectric crystal elements rigidly positioned within the transducer are deformed when pressure is applied through the wall to the contoured end surface of the piston means, and an output electrical signal is produced proportional to the applied pressure. Installation of the transducer in a test body is facilitated by a captive retaining nut rotatably connected on the transducer housing and having external threads for connecting in the test body. An alignment guide is carried by the transducer and engages the test body in a manner providing precise rotational alignment and permitting depth adjustment of the contoured end surface.

9 Claims, 8 Drawing Figures

CONFORMAL PRESSURE TRANSDUCER

CROSS REFERENCE TO A RELATED APPLICATION

This is a division of application Ser. No. 381,700 filed July 23, 1973, now U.S. Pat. No. 3,856,792 which is a continuation-in-part of Ser. No. 234,017 filed Mar. 13, 1972, now abandoned.

BACKGROUND OF THE INVENTION

This invention relates to dynamic pressure and force transducers, and more particularly to a novel piezoelectric transducer for measuring dynamic pressure in tubes or passages without introducing discontinuities in the surfaces thereof that could appreciably disturb the flow process.

One area of use of the present invention is in measuring through the case wall of an unmodified cartridge the chamber pressure developed during tests of guns and ammunition. One form of prior art apparatus for measuring pressure in the testing of guns and ammunition included a piston and cylinder mechanism actuated by chamber pressure to deform a lead or copper disk and appropriately is known as a lead or copper crusher. The resulting deformation of the disk is measured with a micrometer to give relatively limited information concerning peak pressure or the time integral of pressure. Although this apparatus presently remains in use and provides industry standards, it is not really adaptable to automated testing, process analysis, or testing of automatic weapons. Furthermore, in order to deform a lead or copper disk the piston must move an appreciable distance, and this in turn requires that pressure be applied to the piston face from a hole or aperture drilled in the cartridge case and aligned with the piston face.

Although the merits and potential of quartz piezoelectric instruments for ammunition testing were recognized many years ago, the difficulties arising from the need to condition the ultrahigh impedance signal delayed any significant progress until relatively recent times. A long history of evolutionary development, however, indicates that quartz is perhaps the only electronic transduction mechanism with the ruggedness, rigidity, stability and durability required in automated ammunition testing. Early versions resembled the crusher mechanisms with the lead or copper disks replaced by a quartz piezoelectric element. Separate piston and cylinder adaptors transmitted chamber pressure into a force acting on conventional quartz pressure transducers. However, lubrication and sealing of the piston presented serious operational problems, and the inertia of the piston introduced spurious dynamic effects which tended to obscure the pressure signal.

Another version was the high pressure, diaphragm type wherein a thin sheet metal membrane secured to the face of the instrument sealed against pressure and served as a flexure to mechanically isolate the sensitive inner quartz column from stresses acting on the outer housing. One problem with this version is that after a relatively few tests the diaphragm is subject to fatigue or change in effective area thereby impairing the sensitivity. Another problem is that this version requires a recessed mounting with connecting passage or cavity, thermal insulation of the diaphragm, and access hole in the cartridge wall or mounting downstream of the projectile, all of which have been found to introduce spurious signals and to sometimes interfere with the projectile motion.

In an attempt to overcome these problems, the machined diaphragm transducer was developed and is characterized by an essentially one piece or integral housing and machined flexure. This prolonged instrument life somewhat but not by a considerable amount, and the difficulties in modifying cartridges, maintaining connecting passages, and replacing thermal insulation restricted widespread acceptance and use of this version. Although mounting of a conventional diaphragm type transducer in a slight recess downstream of the case mouth avoids the necessity of modifying the cartridge, it does not measure true chamber pressure because of the throttling effects at the cartridge mouth and gas resonances in the connecting passages. Measured results are observed to differ appreciably in peak amplitude and waveform.

SUMMARY OF THE INVENTION

It is, therefore, an object of this invention to provide a new and improved transducer for measuring gun chamber pressure in unmodified cartridges without disturbing the flow process.

It is a further object of the present invention to provide such a transducer for measuring chamber pressure which allows rapid repetitious weapon firing and which is insensitive to high temperatures involved in the flow process.

It is a further object of the present invention to provide such a transducer which is easy to install, align and remove, which does not require frequent maintainence, cleaning or thermal insulation replacement, and which does not require a tight effective pressure seal.

It is a further object of this invention to provide in conjunction with such a transducer, a calibration fixture for directly applying known pressure through an actual cartridge case to the transducer for calibration purposes.

The present invention provides a transducer for converting pressure changes into electrical signals and including integral piston means for transmitting the applied pressure into a force or stress acting on quartz piezoelectric elements. The pressure changes occur in a chamber or passage and act on one surface of a relatively thin wall, and the transducer piston means has a contoured sensitive end surface conforming to the other surface of the wall opposite that on which the pressure is acting. When the pressure changes are within a tube, for example within a cartridge in ammunition testing, the contoured end surface is concave. A captive retaining nut is rotatably carried by the transducer housing and has external threads for connecting to a test body in which the transducer is installed. A guide means carried on the transducer engages the test body in a manner providing precise rotational and depth alignment of the contoured end surface. In conjunction with the transducer, a calibration fixture means is provided for applying known static pressure to the transducer through an actual cartridge case when ammunition is to be tested.

While several specific embodiments of the principles of the present invention are illustrated in the accompanying drawings and described in detail in the following specification, it is to be understood that such embodiments are by way of example only and that various modifications may be made without departing from the spirit of the invention, the scope of which is defined in the appended claims.

DETAILED DESCRIPTION OF THE ILLUSTRATED EMBODIMENTS

Figure 1:
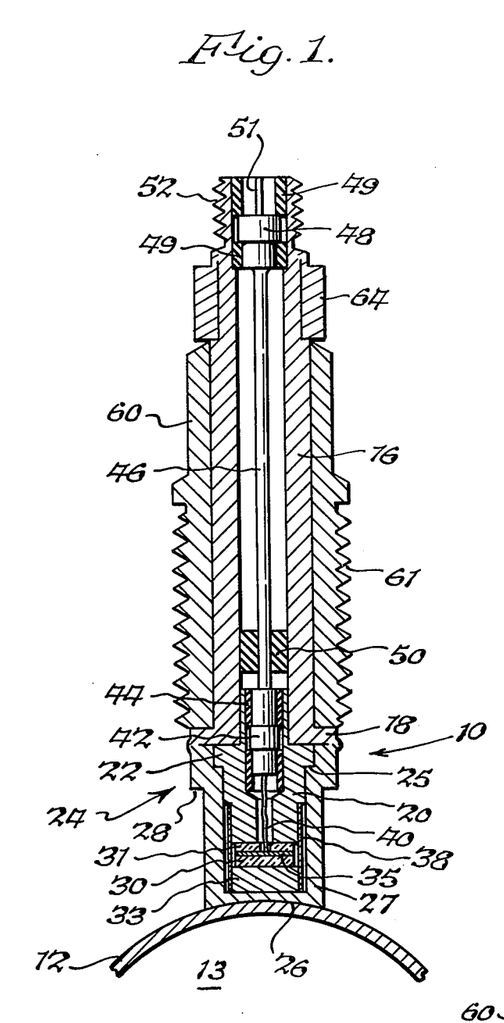
FIG. 1 is a sectional view of a pressure transducer according to the present invention.

FIG. 1 shows a pressure transducer 10 according to the present invention as it would appear in contact with one surface of a wall 12 defining a region 13 wherein pressure changes to be measured by transducer 10 exist. In the testing of ammunition by transducer 10, wall 12 comprises a relatively thin cylindrical brass cartridge shell. Transducer 10 comprises a substantially hollow cylindrical body member 16 of suitable metal which terminates at one end in an annular flange 18, the outer or peripheral diameter of which is slightly greater than the outer diameter of cylindrical body 16. A base or support member 20 is provided with a thin-walled cylindrical extension 21 at one end thereof which is fitted within body 16 at the end thereof including flange 18. Base member 20 has an annular flange 22 defining an end surface meeting extension 21 at substantially a right angle and contacting flange 18, the outer or peripheral diameter of flange 22 being less than that of flange 18. Base member 20 is provided with inner bores of different diameters along the longitudinal axis thereof for a purpose to be described.

Transducer 10 of the present invention further comprises a force-transmitting means in the form of a contoured piston and flexure member 24 which is generally cylindrical and provided with an interior region or chamber and open at one end having an inner wall surface at that end of a size and contour permitting member 24 to be pressed and welded onto base member 20. Member 24 also is welded adjacent the periphery of the open end thereof to flange 18 of body member 16. In particular, member 24 is provided with an annular shoulder 25 on the inner surface thereof which shoulder receives annular flange 22 of base member 20. Member 24 is provided at the other end thereof with a contoured end surface 26 which conforms to the outer surface of wall 12 in a manner which presently will be described in detail.

Transducer 10 further comprises first and second piezoelectric elements 30 and 31, respectively, disposed within the housing of transducer 10 and mechanically connected to piston 24 so that pressure applied through a thin brass cartridge shell to the contoured end surface 26 of piston 24 deforms the piezoelectric crystal element thereby generating an electrical output signal proportional to the applied pressure. Piezoelectric elements 30, 31 of the present illustration are x-cut quartz crystals operating in a thickness compression mode. Alternatively, any of the commonly employed crystal materials or geometries will function satisfactorily. Because quartz is polarized in its natural state and is exceptionally rigid and stable, it is the preferred crystal material for elements 30 and 31.

Piezoelectric elements 30 and 31 in the present illustration each comprises a single crystal, and the elements 30, 31 are connected mechanically in series and electrically in parallel. In particular, a metal disk member 33 is placed in the inner cavity or region of piston member 24 firmly against the wall of member 24 in which contoured end surface 26 is formed. Piezoelectric element 30 is placed against disk 33, and a metal electrode 25 is sandwiched between piezoelectric elements 30 and 31, the elements 30, 31 in turn being rigidly positioned between disk 33 and the end surface of base member 20. In the present illustration the piezoelectric element 31 is provided with a central aperture or bore therethrough permitting electrical connection to electrode 35 in a manner which presently will be described. While elements 30, 31 as shown and described are connected mechanically in series and electrically in parallel, alternatively they could be connected both mechanically and electrically in parallel or could be substituted by a single crystal element and insulator.

Piezoelectric elements 30, 31 are preloaded to improve the rigidity at the interface surfaces of the quartz crystals. Disk 33 and the end of base member 20 adjacent piezoelectric element 31 each have substantially the same outer diameter which is less than the inner diameter of piston member 24 by an amount sufficient to accommodate a pre-stressed preload sleeve member 38 which is secured by spot-welding to base member 20 and to disk 33. One end of sleeve 38 abuts the inner surface of the wall of piston 24 in which contoured end surface 26 is formed. The other end of sleeve 38 abuts an annular shoulder provided in base member 20 about mid-way between annular flange 22 and the end of base member 20 adjacent element 31. An alternative arrangement for prestressing elements 31, 31 would include a central preload stud passing through central bores or apertures provided in washer-type crystal elements and securely clamping piston member 24 or disk 33 to base member 20. The crystals 30, 31 could equally well be preloaded by prestressing the walls of the transducer housing, and of course if the crystal elements could be perfectly machined or bonded and mated to opposing surfaces they could function satisfactorialy without any preloading.

Electrode 35 is connected by means of a wire 40 to an electrical connector member 42 positioned within base member 20 and within extension 21 by means of a sleeve-like insulator member 44. Another wire member 46 connects electrical connector member 42 to an external electrical connector member 48 at the end of transducer 10 opposite piston 24. Connector member 48 is positioned within cylindrical body member 16 by means of sleeve-like insulator members 48, and another insulator member 50 provided with a longitudinal bore support wire 46 within body member 16. Connector member 48 is provided with a central socket member 51 which together with the external threads 52 on this end of body member 16 facilitate connection of a standard coaxial connector member to transducer 10. As a result, the inner conductor of the coaxial cable is electrically connected through connector 48, wire 46, connector 42, wire 40 and electrode 35 to a first pair of surfaces of the elements 30, 31. The remaining, opposite surfaces of piezoelectric elements 30, 31 are electrically connected to ground and the outer conductor of the coaxial cable through a path defined by disk 33, sleeve 38, base member 20 and cylindrical body member 16.

The contoured end surface 26 of integral piston member 24 in the present illustration is a concave curved surface conforming to a cylindrical cartridge casing and to gun chamber walls. Surface 26 can be any three-dimensional concave, planar, or convex surface conforming to a regular or irregular shaped object, chamber or passageway so that no discontinuities exist on the walls of the test object that might disturb the flow process being measured.

The integral piston structure or mechanism 24 comprises a rigid, cylindrical metal piston including an elastic cylinder wall 27 which surrounds the crystals 30, 31 which is relatively thin and flexible in the axial direction to allow forces to be transmitted through the rigid contoured piston to the crystal elements 30, 31. Thus the entire end portion of the housing of transducer 10 forms the piston, which freely but almost imperceptively moves within the close fitting cylindrical walls of the mounting cavity in the test object. The piston of the present invention moves in response to pressure force, but its integral structure and flexure constraint cause it to differ appreciably as compared to pressure transducers including pistons heretofore available. Instead of being guided by the cylindrical walls of the mounting cavity in the test object, the piston of the present invention is constrained to move axially by the integral flexural wall 27 of the transducer housing. When measuring pressure through the thin brass walls of a cartridge casing, the transducer of the present invention also can be viewed as a distributed parameter transducer wherein the cartridge case wall forms the diaphragm, the test object forms the housing, and the transducer of the present invention is the transduction element.

In the present illustration, the elasticity or rigidity of housing or piston wall 27 relative to the column of crystal elements 30, 31 is not critical in the transducer of this invention. About 50 percent of the force due to pressure on the piston 24 is transmitted through the sensitive column of crystal elements 30, 31, and the remaining force is transmitted through the flexible wall 27 to base member 20. However, this percentage can vary in the range from about 10 to about 100 percent without appreciability affecting operation of the transducer 10.

Numerous tests using transducer 10 of the present invention to measure pressure through the walls of a cartridge case, wherein contoured surface 26 of piston 24 comprises merely a base metal surface, have indicated that no appreciable amount of heat reaches the peizoelectric elements 30, 31. 30, no additional thermal insulation is required for transducer 10 under such circumstances. When transducer 10 is used to measure pressure developed by caseless ammunition or pressure in a closed bomb chamber, on the other hand, effective thermal insulation is provided by a thin permanent uniform coating 55 of zirconium oxide, known commercially under the trade name Rokide, applied to surface 26. Coating 55 sufficiently thermally insulates the surface 26 of piston 24 to prevent spurious temperature signals from appreciably distorting the pressure signal developed by transducer 10. Coating 55 is applied to surface 26 by well-known flame coating techniques.

The structure of transducer 10 shown in FIG. 1 is completed by a clamp nut number 60 rotatably positioned on cylindrical body member 16 and provided with external threads 61 along approximately half the axial length thereof. A collar member 63 is fixed on body member 16 such as by welding so as to be axially adjacent clamp nut 60 and the external end of the transducer 10 where connection to a coaxial connector is made. The captive retaining nut 60 rotates freely with respect to the transducer housing and the external threads thereon engage corresponding threads in a test body whereby rotation of nut 60 effects installation and removal of transducer 10 in the test body. Collar member 63 is provided with external flats 64 or the equivalent having fixed orientation relative to the contoured surface 26 of piston member 24. Accordingly, this enables transducer 10 of the present invention to be properly installed and aligned from outside of the test object. In particular, alignment is maintained during installation by holding the flats 64 of collar 63 stationary, such as with a wrench, while retaining nut 60 is rotated to tighten transducer 10 in the test object or fixture. Washer type shims are placed adjacent shoulder 28 of piston member 24 to control the depth to which transducer 10 is positioned and to seal transducer 10 against any directly applied pressure as will be described in detail presently. Rotating captive retaining nut 60 in a direction to unscrew it from the test object or fixture results in removal of transducer 10 for inspection and recalibration. As an alternative method of installation, the transducer housing could be threaded or provided with a welding flange to permit permanent installation in the test object or fixture, and the contoured end face 26 of piston 24 then could be formed when the cavity is machined in the test object.

Figure 2:
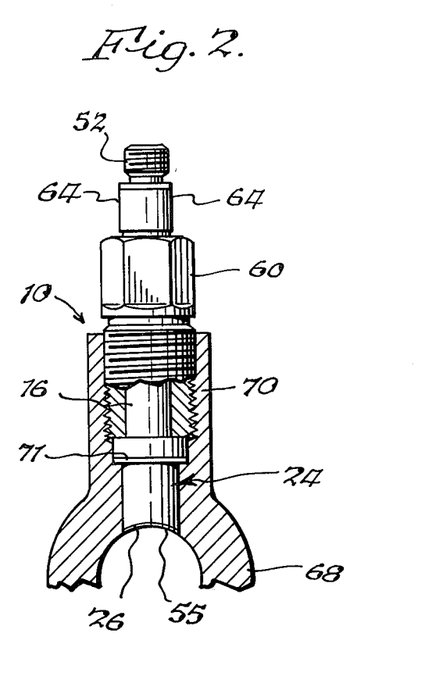
FIG. 2 is a fragmentary elevational view, partly in section, illustrating the pressure transducer of the present invention as it would appear in use.

FIG. 2 illustrates transducer 10 of the present invention as it would appear mounted or installed in a gun chamber or barrel 68 for testing ammunition. Chamber 68 is provided with a mounting hole or aperture through the wall thereof for receiving piston 24 of transducer 10. The diameter of piston 24 is matched according to specified sizes of mounting holes. Chamber 68 is provided with a mounting boss 70 which is welded to the external or exterior surface of chamber 68 and positioned in alignment with the mounting hole. Inside boss 70 adjacent the lower end thereof an annular shoulder or seat is provided for receiving shoulder 28 of piston member 24. A washer-type shim 71 is placed on the annular seat for sealing the assembly. Furthermore, the depth to which transducer 10 is installed or positioned can be precisely controlled by altering the thickness of seal 71 or varying the depth of mounting shoulder 28 of piston 24. The inner surface of cylindrical boss 70 is provided with threads for engaging the external threads 61 on clamp member 60.

Figure 3:
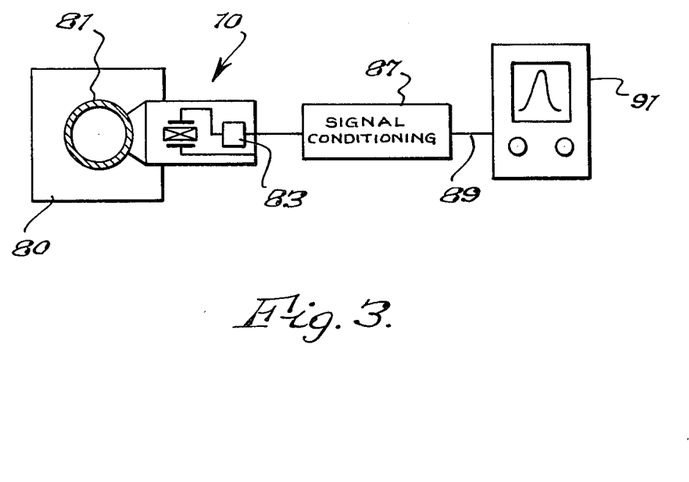
FIG. 3 is a block diagram showing the pressure transducer of the present invention in a text system.

FIG. 3 is a block diagram showing the transducer 10 of the present invention in a test system such as ammunition testing apparatus. A calibration fixture or gun barrel and chamber is indicated schematically at 80, an ammunition cartridge casing is represented at 81, and transducer 10 is shown with contoured end surface 26 thereof in contact with the outer surface of casing 81. In the present illustration, a charge converting amplifier 83 connected electrically to piezoelectric elements 30, 31 is in the form of a microelectronic integrated circuit capsule which advantageously can be built in transducer 10, being located in the cavity of body member 16 adjacent the external electrical connector. A cable 85 connects the electrical output of transducer 10 to the input of a signal conditioning circuit 87. Circuit 87, which includes capacitive elements, conditions the signal to make it compatible with the input of device 91, and the detailed construction and operation of circuit 87 is believed to be readily familiar to those skilled in the art so that a detailed description thereof is believed to be unnecessary. A cable 89 connects the output of circuit 87 to the input of a conventional display and recording device 91.

Figure 4:
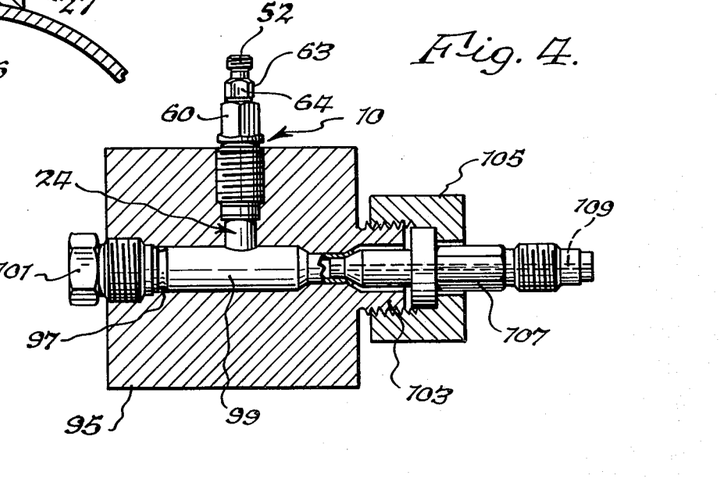
FIG. 4 is a sectional view of the pressure transducer in a calibration fixture according to the present invention.

A calibration fixture according to the present invention for applying known calibration pressure to transducer 10 through an actual cartridge casing is shown in FIG. 4. The calibration fixture comprises a body 95 provided with an interior chamber 97 for receiving an empty cartridge casing 99 and a bore or aperture extending through body 95 in a direction perpendicular to the axis of chamber 97 and communicating with the chamber for receiving transducer 10 of the present invention. As in the construction of FIG. 2, the bore or aperture is provided with threads for engaging threads 61 on the outer surface of transducer 10, and transducer 10 is installed or removed in body 95 by rotating captive retaining nut 60 while holding collar member 63 stationary with flats 64 thereof positioned to place contoured end surface 26 of the transducer piston 24 in proper conformity with the outer surface of casing 99. Also like the construction of FIG. 2, body 95 has a shoulder or seat provided in the bore for supporting annular flange 28 of transducer 10, the depth of penetration of transducer 10 being adjusted by means of washer-like shims or by the dimension of the annular flange.

Chamber 97 is closed at one end, i.e. the left-hand end in FIG. 4, by a bolt-like member 101 which threadably connects in the end of chamber 97 and contacts the end of casing 99 to retain it in the desired axial position in chamber 97. The other end of chamber 97 communicates with a boss 103 extending from body 95 and provided with threads on the outer surface thereof for connecting with threads on the inner surface of a pressure adapter retaining nut 105. A pressure adapter 107 fits into boss 103 so as to be in communication with chamber 97 and the interior of the empty cartridge casing 99. Pressure adapter 107 is maintained in a fluid-tight position with chamber 97 by connection of retaining nut 105 on boss 103. Adaptor 107 is provided with an input port 109 for connection to a high pressure source, such as dead weight tester, which supplies calibrating pressure to the interior of cartridge casing 99.

Pressure applied to the inside of cartridge casing 99 is transmitted through its walls to the contoured piston face 26 of transducer 10 which intimately contacts the expending cartridge casing 99 over the full surface area of interest, i.e. the entire area of piston face 26. Pressure applied to the case walls of a cartridge 99 gives a different result as compared to pressure applied directly to the face 26 of the transducer primarily because of the effects of the directly applied pressure also acting on the cylindrical side wall 27 of piston 24 which tends to increase its rigidity and thereby reduce the output signal for the same amount of applied pressure.

Transducer 10 of the present invention operates in the following manner. Transducer 10 is installed in a test body, for example gun barrel 68, by turning captive retaining nut 60 while holding collar 63 and the flats thereof in a fixed position as previously described so as to place contoured end surface 26 in contact with the outer surface of a tube containing pressure to be measured, for example cartridge shell 12 shown in FIG. 1 when transducer 10 is employed in ammunition testing. When installation is completed, contoured end surface 26 firmly contacts and conforms to the outer surface of shell 12, and advantageously transducer 10 intimately contacts cartridge casing 12 over the entire sensitive end surface area of the transducer 10. Pressure developed in region 13 within casing 12, in response to firing of the cartridge in the test fixture, expands casing 12 which applies a force uniformly over the entire contoured end surface 26 of piston 24 with the result that a force is applied to piezoelectric elements 30, 31. Piezoelectric elements 30, 31 in response to being deformed or stressed by the externally applied force generate or displace an electrical charge proportional to the applied force. The sheet metal electrode 35 shown in FIG. 1 collects the charge signal generated by crystals 30, 31 and the signal is conducted by lead 40, connector assembly 42, lead 46 end connector 48. As shown in FIG. 3, this signal is first amplified by an amplifier 83 which advantageously is positioned in the transducer housing whereupon an amplified signal is transmitted from transducer 10 through line 85 to signal conditioning circuit 87. The charge-type signal is converted to a low-impedance voltage or current type signal according to the well known law of electrostatics: $V=Q/C$. A signal from circuit 87 is applied through line 89 to means providing information of pressure amplitude, for example a display device 91 such as a conventional oscilloscope, wherein a voltage waveform providing information of pressure amplitude versus time is provided. The various components of transducer 10 preferably are made of stainless steel. Satisfactory results have been obtained with the thinnest dimension of contoured end surface 26, which is measured in a direction parallel to the longitudinal axis of transducer 10, being about one-half the thickness of the piston wall 27.

The structure of transducer 10 including integral piston member 24 having end surface 26 contoured to conform to the surface of the tube or shell containing the pressure to be measured advantageously avoids any need to drill or otherwise provide a hole or aperture through the tube wall. As a result, measurements provided by transducer 10 do not alter or disturb the flow process being measured. In other words, there are no connecting passages or cavities which introduce spurious gas dynamic effects that obscure the true pressure signal. The structure of integral piston 24 including contoured end surface 26 and the relatively thin cylinder wall 27 which flexes slightly in an outward direction from the transducer axis in response to applied force, provides a relatively larger effective area for the force to act on the transducer then heretofore possible in conventional transducers. In particular, the effective area comprises the whole area of the end of the transducer thereby providing a highly accurate and true measure of the pressure change in the region of interest. The relatively rigid yet simple construction of transducer 10 of the present invention gives it a relatively high life expectancy allowing large numbers of repetitive measurements in ammunition testing particularly in automated testing, and requires little or no maintenance or cleaning. In addition, the rigid construction of transducer 10 limits the displacement and deformation of the cartridge casing 12 in the vicinity of the transducer. Contoured end surface 26 of piston 24 not only eliminates the need to modify cartridge 12 but also does not require any particular alignment of cartridge casing 12 in the test fixture or gun barrel chamber. While transducer 10 has been described in connection with measuring pressure developed inside a tube, as in ammunition testing, the pressure outside a tube can be measured also by placing transducer 10 inside the tube and by having contoured end surface 26 convex.

Figure 5:
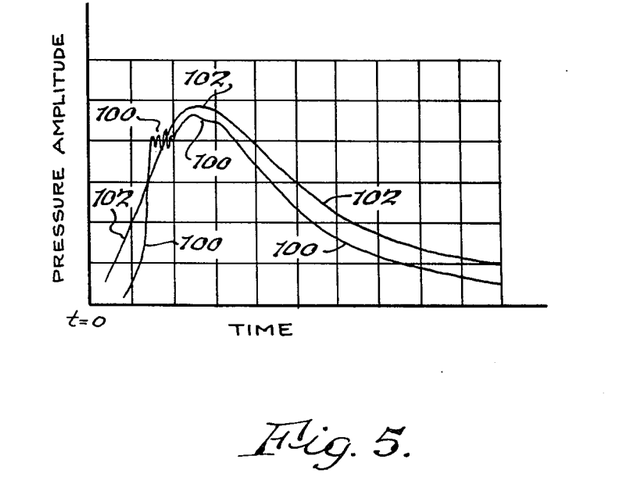
FIG. 5 is a graph illustrating waveforms of pressure-time characteristics of the pressure transducer of the present invention and a prior art transducer.

The various advantages of transducer 10 of the present invention in ammunition testing are illustrated further in FIG. 5 which includes presssure-time plots comparing transducer 10 with a conventional flat diaphragm type transducer. In particular, curve 100 is a plot of pressure amplitude over time for a conventional diaphragm type transducer mounted at the ammunition cartridge case mouth where a mounting hole or aperture is provided through the case. Curve 102 is a plot of pressure amplitude over time for transducer 10 of the present invention which is positioned with contoured end surface 26 of piston 24 in intimate contact with the cartridge casing wall. Time is given in 0.1 milliseconds per centimeter or division, and pressure is given in units of 10,000 p.s.i. per centimeter or division. Firing of the cartridge occurs at time $t=0$, and the output signal developed by transducer 10 of the present invention grows in amplitude relatively smoothly as indicated by the smooth shape of curve 102. The diaphragm transducer, on the other hand, does not see any pressure until the projectile, acting as a valve, passes the transducer mounting hole. Then the transducer experiences a rapid build up as indicated by the initial shape of curve 100 with attendant overshoot and oscillation representative of gas dynamic effects when a passage is shock excited.

The peak amplitude of the output signal provided by transducer 10 of the present invention is greater than that of the diaphgram transducer as shown in FIG. 5. This is because with the diaphgram transducer being mounted at the cartridge mouth, it experiences throttling effects caused by the approximately 2:1 reduction area resulting from the neck down shape of the cartridge case at the mouth. At the end of the test measurement, the output signal developed by the diaphgram transducer undershoots the zero or base line whereas the signal developed by transducer 10 of the present invention does not. This is because the diaphragm transducer is relatively unprotected from thermal effects which superimpose negative signals on the pressure-time output signal. Advantageously, the output signal provided by transducer 10 of the present invention is relatively clean and smooth, free of spurious signals, and therefore more representative of the true pressure being measured in the region of interest.

Figure 6:
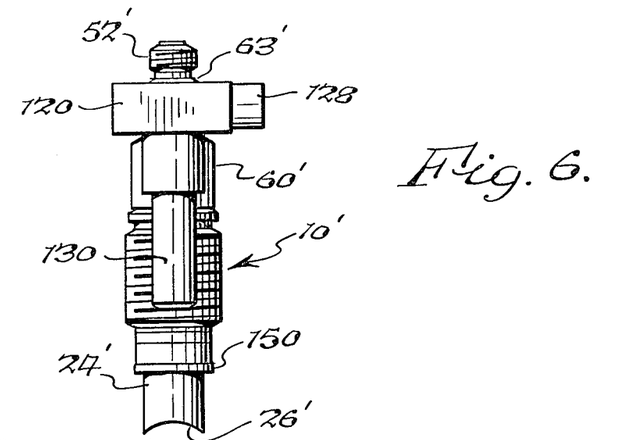
FIG. 6 is an elevational view of the pressure transducer provided with an alignment means according to the present invention.
Figure 7:
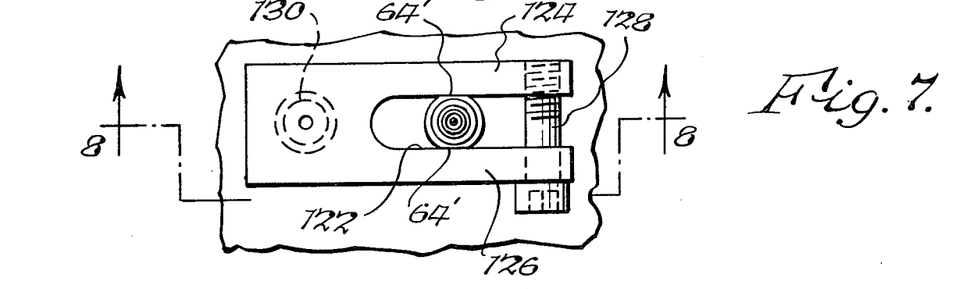
FIG. 7 is a top plan view of the transducer and alignment means inserted into a test body during use.
Figure 8:
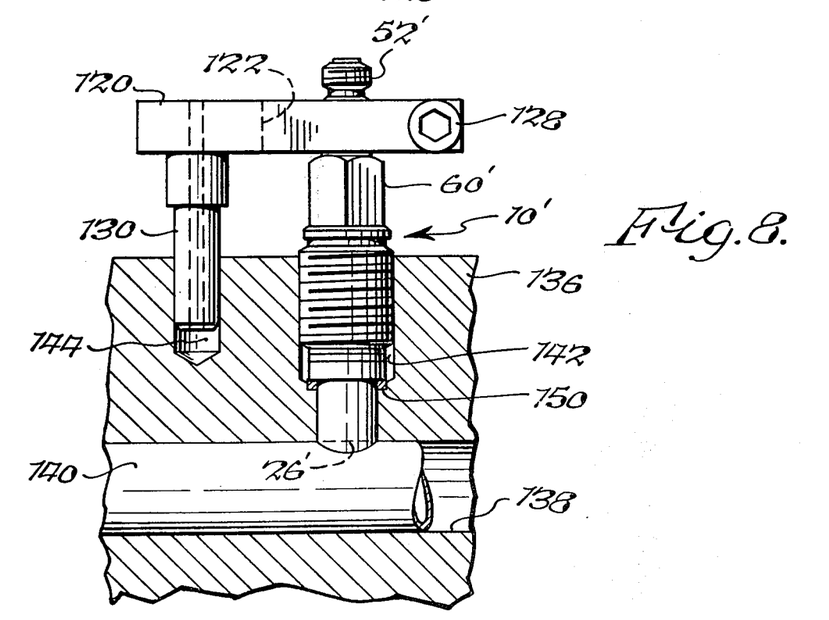
FIG. 8 is a sectional view taken about on line 8—8 in FIG. 7.

FIGS. 6–8 show the pressure transducer of the present invention provided with an alignment guide means which enables precise rotational alignment and depth adjustment of the contoured end surface of the transducer piston means. The pressure transducer of FIGS. 6–8 is identical in construction and operation to transducer 10 of FIGS. 1–5 and therefore is identified in FIGS. 6–8 by the same reference numerals but having a prime designation. The alignment guide means comprises a clamp member 120 preferably in the form of an elongated rectangular bar which is provided with a slot 122 extending inwardly from one end thereof so as to define a pair of spacedapart leg members 124, 126 as best seen in FIG. 7. Clamp member 120 is connected to transducer 10' so as to be carried thereby and in a manner such that a portion of clamp member 120 extends from the transducer housing in a direction generally perpendicular to the housing axis and at a location above the portion of transducer 10' which is connected in the test body during use. In preferred form, clamp member 120 is fitted onto transducer 10' with the opposed, inner surface of leg members 124, 126 contacting the external flats 64' of collar member 63'. Clamp 120 is tightened or secured onto collar 63' by means of a screw 128 which threads into both leg members 124, 126 in a manner whereby tightening of screw 128 tightens the grip of members 124, 126 on flats 64' of the transducer collar 63'.

The alignment guide means further comprises a pin member 130 which can be formed integral with bracket member 120 or which can be separately attached or secured thereto. Bracket 120 connects pin 130 to the housing of transducer 10' in a manner such that pin 130 has a fixed alignment relative to contoured end surface 26' of piston means 24'. The longitudinal axis of pin member 130 is aligned accurately with the contoured end surface 26' of piston means 24', in particular the longitudinal axis of pin 130 is disposed perpendicular to the axis of curvature of the concave surface 26'. Furthermore, pin 130 is disposed so that the longitudinal axis of pin 130 and the axis of curvature of concave end surface 26', i.e., a line through the point about which surface 26' is described, lie in the same plane. In addition, the longitudinal axis of pin 130 is disposed parallel to the longitudinal axis of the housing of transducer 10', and the longitudinal axis of pin 130 is perpendicular to the plane of bracket 120.

FIG. 8 shows transducer 10' as it would appear connected in a test body 136 such as a gun barrel having an interior chamber 138 for holding an unmodified ammunition cartridge 140. Transducer 10' is connected in an access opening or mounting hole 142 in a manner which will be described presently. Access opening 142 communicates with chamber 138 and is provided with two different diameter portions for receiving piston means 24' and the larger diameter portion of transducer 10', which different diameter portions of opening 142 meet in an annular seat. An alignment opening or hole 144 is provided in body 136 spaced from access opening 142 so as to receive pin 130 and has a predetermined alignment with respect to the surface of chamber 138. In particular, opening 144 is drilled in body 136 in a manner such that the center line of the bore 144 intersects the center line of chamber 138. Opening 144 is of sufficient diameter and is disposed so that the center line thereof is parallel to the center line of access opening 142 so that pin 130 can move freely into and out of the hole 144. Hole 144 is of sufficient depth in body 136 so that the end of pin 130 will not contact or abut the inner end of hole 144, in other words so as not to limit travel of pin 130, but hole 144 does not reach or commucate with chamber 138.

Transducer 10' and the alignment guide means are installed in test body 136 in the following manner. Screw 120 is loosened to loosen the slotted clamp 120 relative to collar 63'. A spacer washer 150 of selected thickness is fitted onto transducer 10' adjacent the upper end of piston means 24' as viewed in FIG. 6. Then transducer 10' and the alignment and guide means are installed by threading the transducer captive nut 60' into threaded mounting port 142 while at the same time sliding the clamp 120 fore and aft as needed to allow guide pin 130 to enter hole 144 freely. In other words, clamp 120 is moved back and forth along a plane which is disposed perpendicular to the longitudinal axes of transducer 10', port 142, pin 130 and port 144. This is continued until spacer 150 abuts the annular seat provided in mounting port 142. Then screw 120 is tightened to secure clamp 120 on transducer 10' and captive nut 60' is tightened to secure transducer 10' in the test body 136.

When this is completed, the flushness of contoured end surface 26' with the surface of chamber 138 around opening 142 is inspected, and in most cases this can be done visually. If surface 26' extends too deeply into chamber 138, the foregoing procedure is repeated using a thicker spacer 150. If surface 26' is too deeply recessed from the surface of chamber 138, the foregoing procedure is repeated using a thinner spacer 150. Once a spacer of proper thickness is found to achieve the desired degree of flushness, the assembly can be removed and reinstalled using the same spacer and the proper depth will be achieved each time.

By virtue of this arrangement, rotational alignment of transducer 10' and its contoured end surface 26' relative to the surface of a test body chamber and to the external surface of a cartridge or tube held in the chamber is automatically controlled, and the depth adjustment is accomplished easily and accurately. The provision of slotted clamp 120 allows for tolerance in the location of the guide pin receiving port 144 in an axial direction along the test body 136 relative to opening 142.

It is therefore apparent that the present invention accomplishes its intended objects. While several embodiments of the present invention have been described in detail, this has been done by way of illustration, without thought of limitation.

We claim

1. A transducer for converting pressure changes into electrical signals wherein the pressure changes act on one surface of a relatively thin wall, said transducer comprising:
  a. a housing:
  b. force transmitting means on one end of said housing and having a contoured end surface conforming to the other surface of said wall opposite the surface on which said pressure changes act;
  c. piezoelectric means within said housing and mechanically connected to said force transmitting means;
  d. electrical path defining means for connecting said piezoelectric means to means for deriving an electrical signal; and
  e. alignment guide means carried by said housing and extending from said housing and having a fixed alignment relative to said contoured end surface of said force transmitting means for engaging a body containing said wall at a location having a predetermined alignmemt with respect to said other surface of said wall to align said contoured end surface of said force transmitting means with said other surface of said wall;
  f. whereby when said contoured end surface of said force transmitting means firmly contacts and conforms to the other surface of said wall, pressure applied through said wall to said contoured end surface deforms said piezoelectric means to generate an electrical output signal proportional to the applied pressure.

2. Apparatus according to claim 1, wherein said alignment guide means has a portion which is received in guiding engagement with an alignment opening in the body spaced from an access opening in the body for receiving the transducer housing and having a predetermined alignment with said other surface of said wall whereby as said transducer housing is connected in said access opening said contoured end surface of said force transmitting means is aligned with said other surface of said wall.

3. Apparatus according to claim 1, wherein said alignment guide means comprises:
  a. a pin member adapted to be slidably received in an alignment opening provided in the body spaced from an access opening in the body for receiving the transducer housing and having a predetermined alignment with said other surface of said wall; and
  b. means connecting said pin member to said housing in a manner such that said pin has a fixed alignment relative to said contoured end surface of said force transmitting means and such that said pin is received in the alignment opening as said housing is connected in the access opening of the body;
  c. whereby said contoured end surface of said force transmitting means is aligned with said other surface of said wall.

4. Apparatus according to claim 3, further including means adjustably securing said connecting means to said housing.

5. Apparatus according to claim 1, wherein said contoured end surface of said force transmitting means is concave.

6. Apparatus according to claim 1, wherein said force transmitting means is integral with said housing and is generally cylindrical including relatively this elastic wall means between said housing and said contoured end surface whereby the entire end surface of said transducer is a force sensitive surface.

7. Apparatus according to claim 1, wherein said piezoelectric means comprises first and second piezoelectric crystal elements rigidly positioned within said force transmitting means so as to be deformed by said contoured end surface in response to applied pressure.

8. Apparatus according to claim 1, further including a coating of thermally insulating material on said contoured end surface of said force transmitting means.

9. Apparatus according to claim 1, further including a captive nut rotatably connected on said housing and provided with external threads for engaging threads in the access opening for connecting said housing in the access opening while maintaining a predetermined orientation of said contoured end surface in response to rotation of said nut.

* * * * *

UNITED STATES PATENT AND TRADEMARK OFFICE
CERTIFICATE OF CORRECTION

PATENT NO. : 3,960,018
DATED : June 1, 1976
INVENTOR(S) : Nicholas D. Change et al It is certified that error appears in the above-identified patent and that said Letters Patent are hereby corrected as shown below:

Claim 6, line 3 change "this" to --thin--.

Signed and Sealed this

Fourteenth Day of September 1976

[SEAL]

Attest:

RUTH C. MASON
Attesting Officer

C. MARSHALL DANN
Commissioner of Patents and Trademarks